United States Patent [19]
Sutton et al.

[11] 3,829,128
[45] Aug. 13, 1974

[54] QUICK HITCH ADAPTER
[75] Inventors: Max E. Sutton, Indianapolis, Ind.;
[73] Assignee: Allis-Chalmers Corporation, Milwaukee, Wis.
[22] Filed: Dec. 22, 1972
[21] Appl. No.: 317,645

[52] U.S. Cl......... 280/461 A, 280/415 A, 172/272,
[51] Int. Cl. .............................................. B60d 1/04
[58] Field of Search........ 280/460 A, 461 A, 415 A, 280/479 R; 172/272

[56] References Cited
UNITED STATES PATENTS
3,312,478   4/1967   Knaapi .................. 280/479 R X
3,427,046   2/1969   Sommer et al .............. 172/272 X
3,561,788   2/1971   Carlson et al .............. 280/461 A FOREIGN PATENTS OR APPLICATIONS
1,134,235   8/1962   Germany ..................... 280/461 A Primary Examiner—Leo Friaglia
Attorney, Agent, or Firm—Arthur L. Nelson

[57] ABSTRACT

A quick hitch adapter for adjustably providing connection between a tractor and an implement for category 2 and category 3 hitches by selectively adjusting a base portion of the adapter.

10 Claims, 5 Drawing Figures

PATENTED AUG 13 1974

QUICK HITCH ADAPTER

This invention relates to hitch adapter for a three-point hitch and more particularly to a hitch adapter having adjustable means on the base portion for adjustment horizontally and vertically for category 2 and category 3 type hitches while the adapter is supported by the connections to the tractor.

The attachments connecting an implement to the tractor have become increasingly complex with the modern tractor and with the increase in size of the tractor. The conventional drawbar hitch has been largely replaced by the three-point hitch. Three-point hitches today often use a hitch adapter since the hitching linkages are much larger and connection by use of the adapter has simplified the hitching operation and improved the conditions for the operator to couple the tractor and implement. Accordingly, this invention provides a means whereby the hitch adapter can be adjusted from category 2 to category 3 and vice versa without disconnecting the adapter from the tractor. The adapter is supported by the two lower draft arms and the upper link. The adapter has an adjustable means on the base section where the upper link is connected to the tractor which permits the operator to make the adjustment from category 2 to category 3 and vice versa.

It is an object of this invention to provide a quick hitch adapter for a three-point hitch.

It is another object of this invention to provide a hitch adapter for category 2 and category 3 three-point hitches.

It is a further object of this invention to provide a hitch adapter having means for support on the lower draft arms of a three-point hitch while the adjustment of the adapter can be made on the base section, which is connected to the upper link, for connection to either category 2 or category 3 type implements.

The objects of this invention are accomplished by providing a hitch adapter for connection to a three-point hitch. The hitch adapter includes hooks on the rear side of the adapter for connection to an implement. The adapter has a base section connecting two downwardly extending arms. The base section is connected to the upper link and has provisions for horizontal adjustment in its connection with the two arms on the adapter. A vertical adjustment is also provided on the base itself which permits vertical adjustment which can be made while the hitch adapter is connected to the tractor. The weight of the hitch adapter does not interfere with the operators changing from one category to another.

The preferred embodiment of this invention is illustrated in the attached drawings.

Figure 1:
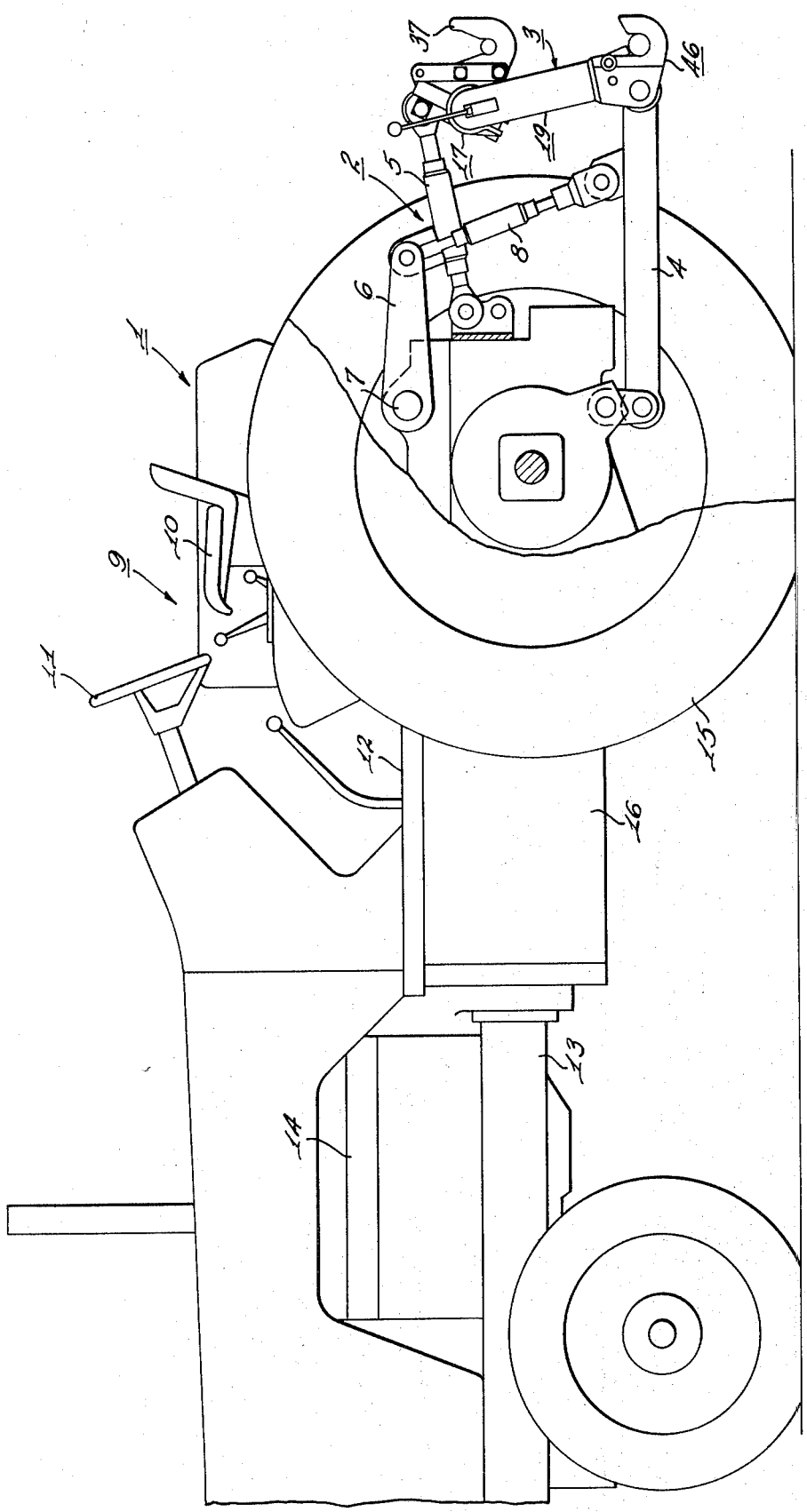
FIG. 1 illustrates a side elevation view of the tractor with the adapter mounted thereon.
Figure 3:
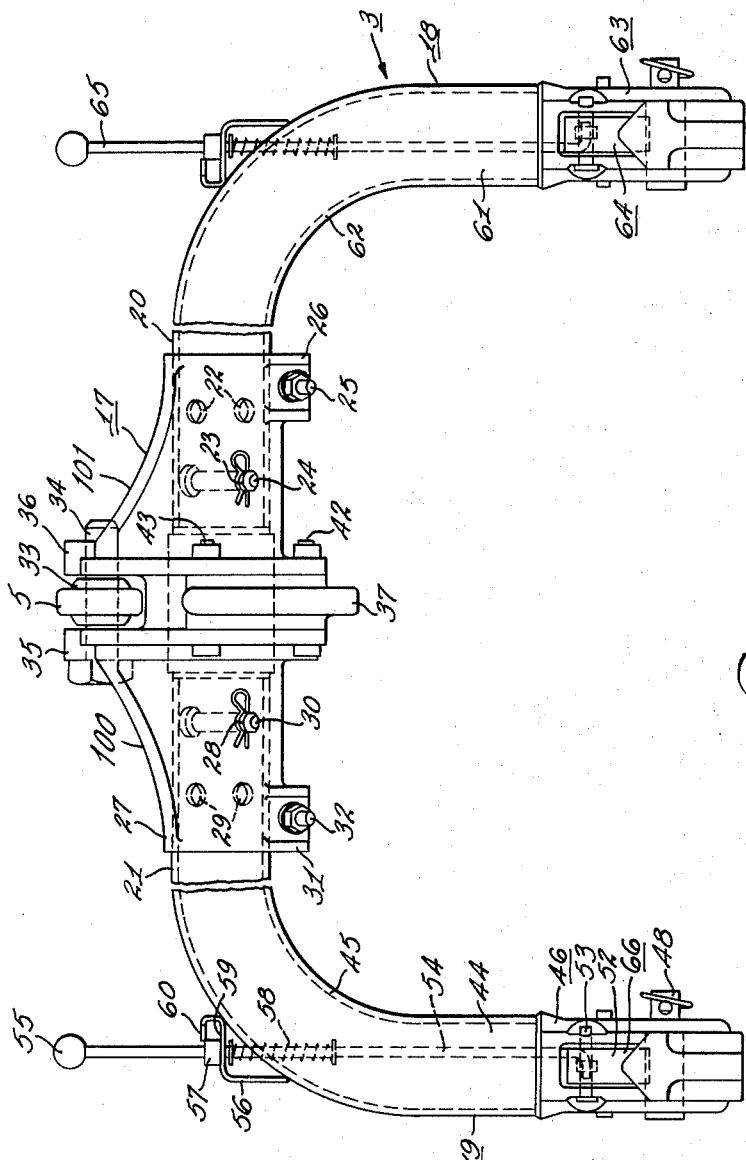
FIG. 3 is a rear view of the adapter.

FIG. 1 illustrates the tractor having a three-point hitch carrying the hitch adapter. The tractor 1 having a three-point hitch 2 carries the hitch adapter 3. The three-point hitch includes a pair of lower draft arms 4 and an upper link 5 connected on their forward ends to the tractor. A pair of rock arms 6 are connected to the rock shaft 7 for raising and lowering the lower draft arms 4 with the lift links 8. It is understood that there are a pair of draft arms 4, lift links 8 and rock arms 6 although the side elevation view only shows one.

The tractor 1 defines an operator station 9 which includes seat 10, steering wheel 11 and platform 12. The tractor 1 includes the chassis 13 supporting the engine 14 for driving the rear wheels 15 through the transmission 16.

Figure 2:
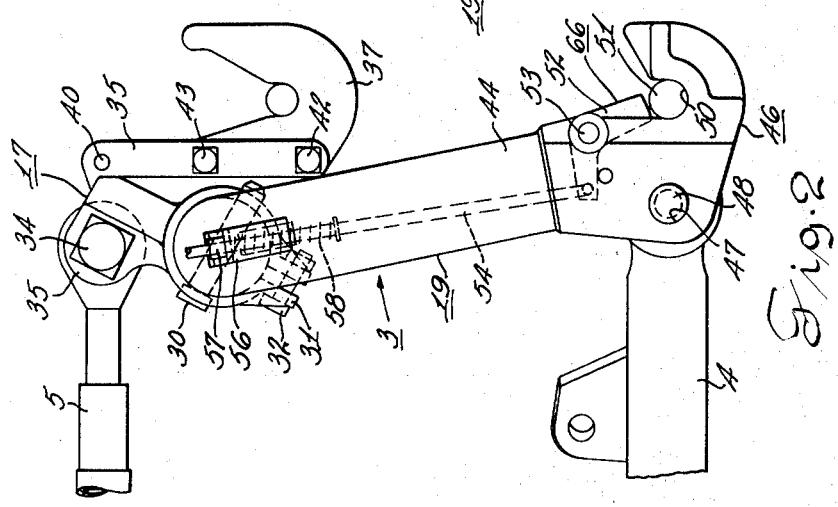
FIG. 2 is an enlarged side elevation view of the adapter mounted on the tractor.
Figure 5:
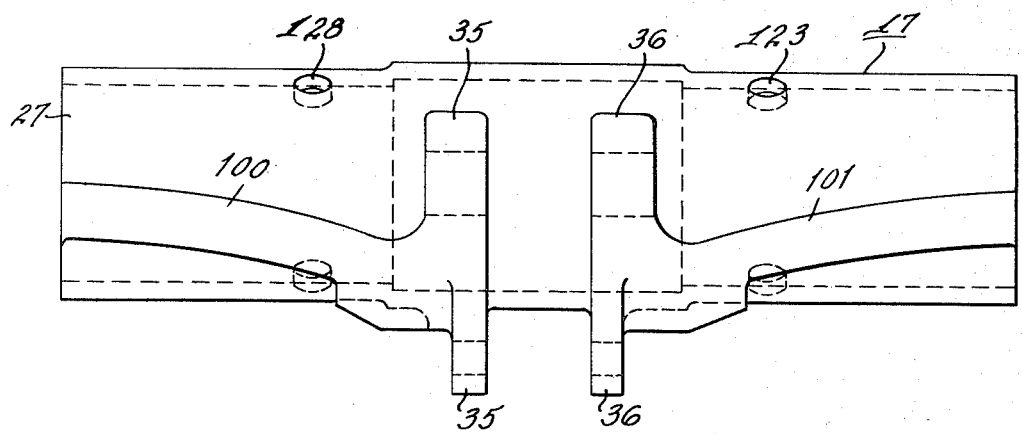
FIG. 5 is a plane view of the base section of the adapter.
Figure 4:
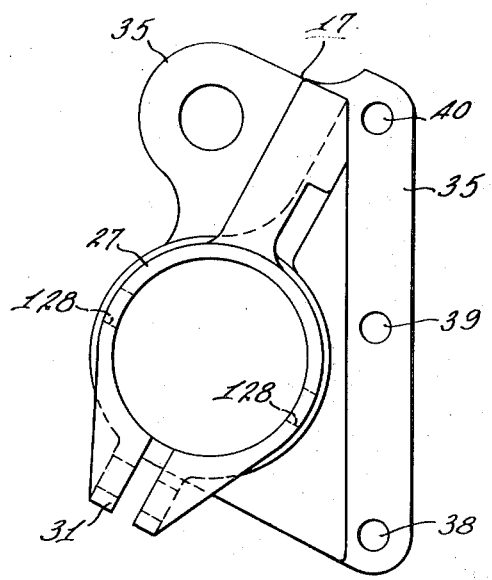
FIG. 4 is a side elevation view of the base section of the adapter.

Referring to FIG. 2 the upper link 5 is connected to the base 17 of the adapter 3. The lower draft arms 4 are shown connected to the lower portion of the hitch adapter 3. The base 17 is carried on the depending arms 18 and 19. Each of the arms is formed with a horizontal section 20 and 21 which extends horizontally into the base 17. The arm 18 is provided with a pair of openings 22 and 23 for selectively receiving the pin 24 to adjustably position the arm 18 in one of the two positions.

The bolt 25 is received in an opening of the clamp portion 26 to clamp the right hand section of the base to the arm 18 in its operating position.

The horizontal portion 21 of the arm 19 is received in the left hand portion 27 of the base 17. A pair of holes 28 and 29 is also provided in the horizontal section 21 to selectively receive the pin 30 to adjustably position the arm 19 in the base 17. The clamp portion 31 receives the bolt 32 providing means for fastening and firmly gripping the left hand portion 27 of the base 17 to the arm 19.

The upper link 5 carries a spherical bushing 33 which supports the upper link 5. The spherical bushing 33 receives the pin 34 which extends through flanges 35 and 36 for connection to the base 17. The flanges 35 and 36 extend rearwardly to form a support for the hook 37. The flanges 35 and 36 are connected to the clamp portions 31 and 26 by reinforcing strips 100 and 101. The flanges 35 and 36 are formed with three openings 38, 39 and 40. The hook 37 is selectively positioned on the flanges and fastened by means of the bolts 42 and 43. When the hook is positioned in the upper position the bolts 42 and 43 are positioned in the holes 39 and 40.

The arm 19 includes the horizontal portion 21 and the vertical section 44 connected by the elbow 45. A hook 46 is integral with the lower portion of the vertical section 44. The hook 46 includes a supporting portion defining an opening 47 for receiving the pin 48. The hook 46 forms the recess 50 for receiving the pin 51 on the implement. The hook 46 carries a latch 66 formed by the bellcrank 52 pivotally mounted on the pin 53. The latch link 54 is pivotally connected to the bellcrank and forms the latch handle 55. The latch link 54 reciprocates in the latch bracket 56. The latch stop 57 is normally in the downward position in response to the biasing force of the spring 58. The latch stop 57 can be positioned in the position as shown on the base 59 or the step 60. When the latch is positioned on the step 60, the bellcrank is open and the latch is out of engagement with the pin 51 of the implement. The position as shown in FIG. 2 shows the latch engaging the pin 51 after it is latched to the implement.

The right hand arm 18 also includes the horizontal section 20 and the vertical section 61 with it connected by the elbow 62. A hook 63 is integral with the lower portion of the vertical section 61. The latch 64 is operated by the latch arm 65 in the same manner as illustrated and described for the left hand arm 19 and latch 66.

The operation of this device will be described in the following paragraphs.

The hitch adapter 3 is mounted on two lower draft arms 4 which are carried on the rear end of the tractor and supported by the lift links 8 which are connected to the rock arms 6. This provides a supporting means for the hitch adapter 3. The upper link 5 is also connected to the tractor on its forward end and is connected to the hitch adapter on its rear end to maintain its position as shown on the tractor. When it is desired to change the hitch adapter from category 3 to category 2 positions, the pins 25 and 32 are loosened and the clamping portions 26 and 31 release the horizontal portions 20 and 21 of the arms 18 and 19. The pin 24 can then be removed and the arm 18 shifted to the left relative to the base 17 and the pin reinserted in the hole 123 in the base 17 and through the holes 22 in the arm 18. Similarly, the pin 30 can be removed and the arm 19 moved to the right and the pin reinserted through the opening 128 in base 17 and through the holes 29 in the arm 19 to decrease the spacing between the lower hooks 46 and 63.

The bolts 42 and 43 are then removed and the hook 37 is lowered to the position in which the bolt 43 is in hole 39 and the bolt 42 is in the hole 38. This positions the hook 37 in the lower position and spaces it a lesser distance above the lower hooks 46 and 63. This operation can be made by allowing the adapter 3 to remain on the three-point hitch. By converting the positions of the hooks and their relative spacing to each other, the adapter is shifted from a category 3 to a category 2 type hitch. This is generally done in the field and removing the adapter from the tractor is extremely inconvenient under these circumstances because the weight of the adapter is too great for a single operator to manage.

The embodiments of the invention in which an exclusive property or privilege is claimed are defined as follows:

1. A tractor hitch adapter for use with a three-point hitch having an upper link and two lower draft arms comprising, a pair of downwardly extending arms, means on said pair of arms adapted for connection to and supported by two lower draft arms of a three-point hitch, a hook and a latch on the end of each of said downwardly extending arms adapted for connection to an implement, a central base member, transversely extending portions integral with each of said arms, transverse adjustable means on said base member and connected to said arms for adjusting said arms transversely with said base member including, positioning means adjustably positioning said arms in at least two positions on said base member, fastening means firmly locking said arms in the positions on said base member, means on said base member adapted for connection to the upper link, an upper hook on said base member adapted for connection to an implement, vertical adjustable means on said base member adjustably connecting said hook in at least two different vertical positions on said base member to thereby provide an adapter while supported on the lower draft arms permitting vertical and transverse adjustment of said adapter.

2. A tractor hitch adapter for use with a three-point hitch having an upper link and two lower draft arms as set forth in claim 1 wherein, said vertical adjustable means on said base member includes means for slidably positioning said upper hook in two different positions.

3. A tractor hitch adapter for use with a three-point hitch having upper link and two lower draft arms as set forth in claim 1 wherein said transverse adjustable means includes opening means in said central base member for receiving and selectively positioning said transversely extending portion of each of said pair of arms in at least two positions relative to said base member.

4. A tractor hitch adapter for use with a three-point hitch having an upper link and two lower draft arms as set forth in claim 1 wherein said pair of arms includes means defining tubular structure for receiving latch operating means.

5. A tractor hitch adapter for use with a three-point hitch having an upper link and two lower draft arms as set forth in claim 1 wherein said fastening means between said base member and said arms includes a clamp on said base member for gripping said transversely extending portion of each of said arms, said positioning means includes hole means in each of said transversely extending portion of each of said arms, a pin received in hole means for selectively connecting each of said arms to said base member.

6. A tractor hitch adapter for use with a three-point hitch having an upper link and two lower draft arms as set forth in claim 1 wherein said base member includes flanges defining transverse openings for receiving bolt means for connection to the upper link and said upper hook.

7. A tractor hitch adapter for use with a three-point hitch having an upper link and two lower draft arms as set forth in claim 1 wherein said base member defines cylindrical openings for receiving said arms, reinforcing strips extending transversely of said base member, a pair of vertical flanges for connection to the upper link and said upper hook.

8. A tractor hitch adapter for use with a three-point hitch having an upper link and two lower draft arms as set forth in claim 1 wherein said base member defines an integral structure including said means adapted for connection to said upper link and vertical adjustable means connecting said upper hook with said base member.

9. A tractor hitch adapter for use with a three-point hitch having an upper link and two lower draft arms as set forth in claim 1 wherein said base member defines a casting of tubular structure adapted for receiving said arms.

10. A tractor hitch adapter for use with a three-point hitch having an upper link and two lower draft arms as set forth in claim 1 wherein said base member defines an integral tubular structure for adjustably receiving each of said transversely extending portions of said arms for providing transverse adjustment, a pair of vertical flanges adapted for adjustably connecting said upper hook to provide vertical adjustment of said hitch adapter.

* * * * *

UNITED STATES PATENT OFFICE
CERTIFICATE OF CORRECTION

Patent No. 3,829,128      Dated August 13, 1974

Inventor(s) Max E. Sutton

It is certified that error appears in the above-identified patent and that said Letters Patent are hereby corrected as shown below:

Column 4, Claim 9, line 4, cancel "a casting of" and substitute --- an integral ---.

Signed and sealed this 3rd day of December 1974.

(SEAL)
Attest:

McCOY M. GIBSON JR.
Attesting Officer

C. MARSHALL DANN
Commissioner of Patents